UNITED STATES PATENT OFFICE.

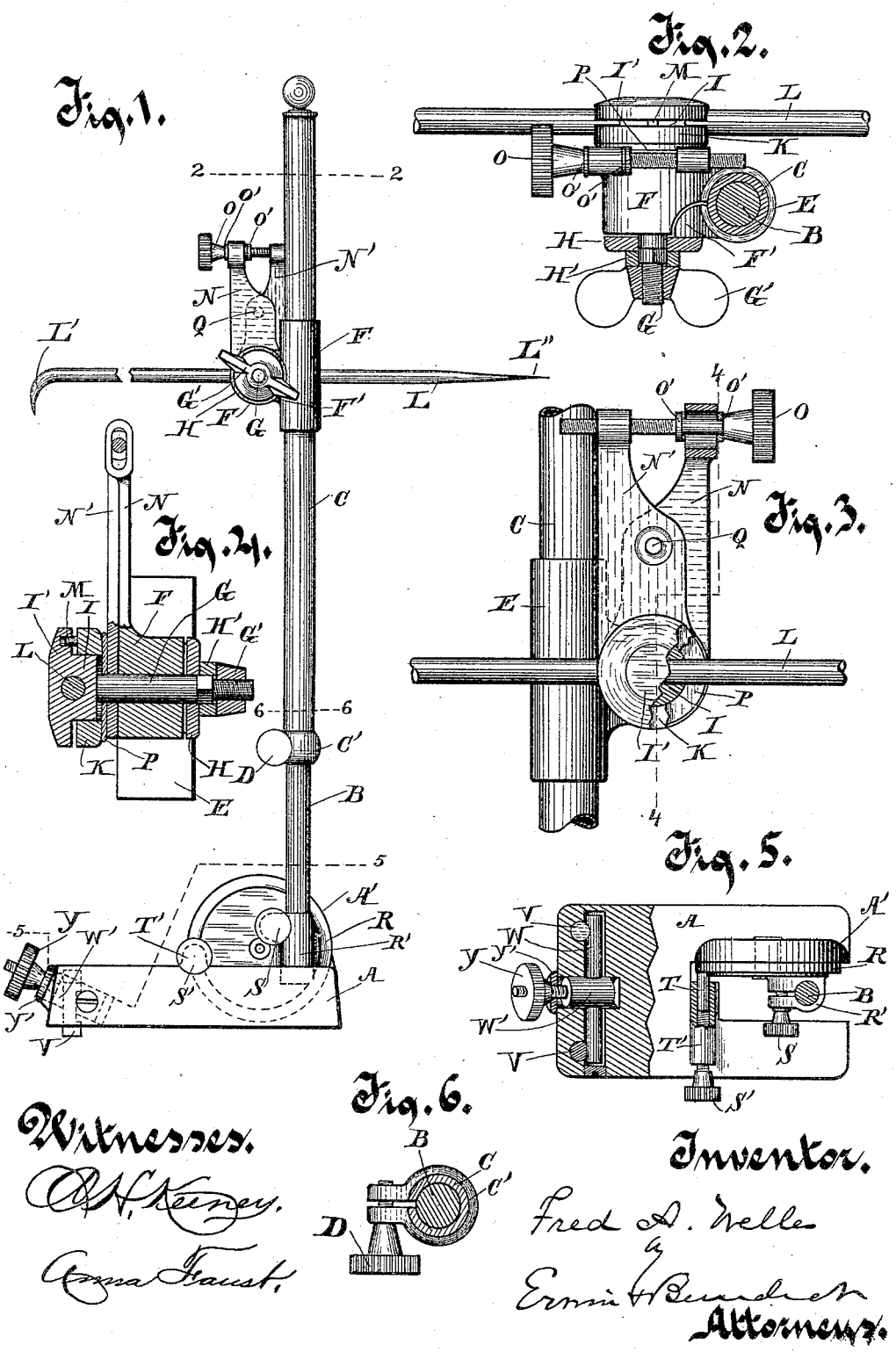

FRED A. WELLES, OF MILWAUKEE, WISCONSIN.

SURFACE-GAGE.

SPECIFICATION forming part of Letters Patent No. 444,865, dated January 20, 1891.

Application filed May 1, 1890. Serial No. 350,209. (No model.)

*To all whom it may concern:*

Be it known that I, FRED A. WELLES, of Milwaukee, in the county of Milwaukee and State of Wisconsin, have invented new and useful Improvements in Surface-Gages; and I do hereby declare the following to be a full, clear, and exact description of said invention, reference being had to the accompanying drawings, and to the letters of reference marked thereon, which form a part of this specification.

My invention relates to the means in a surface-gage for securing exact and perfect adjustments and for conveniently and accurately aligning the instrument and its various parts.

In the drawings, Figure 1 is an elevation of the complete device. Fig. 2 is a top view of the upper portion of the device as seen from the transverse line 2 2 of Fig. 1, parts being in section to show interior construction. Fig. 3 is an elevation of the same part of the device shown in Fig. 2, as seen at an opposite point from the view shown in Fig. 1. Fig. 4 is a vertical section on line 4 4 of Fig. 3. Fig. 5 is a plan and section view on line 5 5 of Fig. 1. Fig. 6 is a transverse section of the standard and its extension-sleeve looking downwardly from line 6 6 of Fig. 1.

A is the base, on which is supported the standard B. A sleeve C in the form of a tube telescoping on the standard B is adapted to extend the length of the standard. At its lower end the sleeve C is provided with a rigid collar C', which collar and sleeve are split on one side, the split extending up a little way only in the sleeve, and a set-screw D turns through lateral projections on the collar C' adjoining the slit in the collar, whereby the sleeve is made to grip the standard or to be loosened therefrom, so as to be adjustable vertically on the standard. A short sleeve E is fitted and slides on the extension-sleeve C. The sleeve E is provided with a head-block F, formed integral with the sleeve E, the sleeve E being split longitudinally on the side next to the head-block, a small portion F' of the head-block on one side of it being integral with that part of the sleeve which is on the same side of the slit. To grip the sleeve E on the sleeve C a washer H is placed on the bolt G, which passes movably through the head-block F, which washer is of such size as to bear against the head-block on one side and against the part F' on the other side. Another small washer H' is also preferably interposed between the washer H and the winged nut G', which nut turns on the screw-threaded end of the bolt G. The bolt G is preferably faced on one or more sides opposite the washer H', which is fitted thereto, whereby the washer H' is prevented from rotating with the nut G', so that the turning of the nut on the bolt conveys no rotary power to the washer H', but only presses it against the part F' and the head-block, so as to grip the sleeve E on the sleeve C. By this means the sleeve E is made adjustable vertically on the sleeve C.

The bolt G is provided with a head having an inner part I of lesser diameter and an outer part I' of greater diameter. A ring K is fitted about the smaller part I of the head, which is of about the same thickness as the depth of the inner part I of the head of the bolt. A pointer L is inserted movably transversely through the head of the bolt G in such manner that its axis is a little within the plane of the inner face of the larger part I', the pointer being outside of the part I in radial grooves therefor in the inner face of the part I' and in the outer face of the ring K. The radial grooves in the faces of the ring K and part I' are each in depth less than the one-half of the diameter of the pointer L, whereby when the ring is forced against the pointer it will grip it firmly in place.

The ring K is held against rotation with reference to the head of the bolt G by a stud M, inserted in the ring and entering movably a socket therefor in the head of the bolt. The pointer L is adjustable endwise in the head of the bolt G and may be readily swung with the bolt G vertically approximately to any angle desired and clamped in place by turning the winged nut G' down with moderate firmness on the bolt G.

To provide for a finer adjustment of the pointer L in a vertical arc, an arm N, integral with the head-block F, projects upwardly therefrom a little distance, and a movable arm N' is pivoted on the bolt G and swings alongside the arm N. A small adjusting-bolt O passes through an aperture therefor in the outer end of the arm N, and turns by screw-thread into the arm N'. The aperture through the arm N is somewhat larger in diameter than the bolt O to provide for a little play of the bolt therein, and collars O' O', fixed on the bolt, bear against the arm N on the inside and outside, whereby the arm is made to swing toward and from the arm N' as the bolt O is turned in or out of the arm N'. By means of thus swinging the arm N', which bears against the ring K, the ring K, the bolt G, and the pointer L are all rotated limitedly, whereby the pointer is made to describe such small arc as may be desired. For increasing the friction between the arm N' and the ring K, a thin copper washer P is inserted between those parts. The movement of the arm N' with reference to the arm N is limited by the stud Q, fixed in the arm N and entering an aperture therefor in the arm N'. The slight rotation of the bolt G through the swinging of the arm N' with reference to the arm N will not loosen the grip between the ring K and the head of the bolt on the pointer, as the bolt is provided with a faced part on which the washer H' is fitted, whereby the washer H' turns with the bolt and carries the nut G' with it without liability of turning the nut on the bolt. The pointer L is preferably provided at one end with a curved extremity L' and at the other end with a sharp point L''.

For supporting the standard B movably on the base A in such manner that it may swing through a vertical arc, a wheel R is axled on a flange A' integral with the base A, a recess being formed in the base alongside the flange A' for receiving the wheel R and the bottom of the supported standard therein. A split bracket R' is formed integral with the wheel R at one side of its axis, which bracket receives the standard B therein and in which the standard is secured adjustably by means of the set-screw S turning in the jaws of the split bracket R'. A small cylindrical block T, located and movable endwise in a bracket T' rigid on the base A, is located in front of the wheel R near its edge and is adapted to be forced against the wheel and held in engagement therewith frictionally by the set-screw S' turning in the bracket T' against the end of the block. The surface of the wheel R is planed off for receiving the bearing of the block T against it. By and through this wheel R, which supports the standard B, and through the related mechanism, the standard is adapted to be swung either to the right or left of a vertical position to such angle as is desired and to be locked in such position by means of the bearing-block T, held in engagement therewith by the set-screw S'.

For conveniently aligning the base A with the table-frame or material on which it is placed, two pins V V are inserted movably in apertures therefor in the under side of the base A, near one end, arranged in a line at right angles to its longer axis. These pins V V are provided on one side with elongated recesses, which receive therein a rod W, inserted in the base A transversely thereof, passing centrally through an elongated nut W', also located in an aperture therefor in the base A. A set-screw Y, passing through a small collar Y', bearing against the end of the base, turns into the nut W' and is adapted to draw the rod W against the pins V V to lock them in position. The recesses in the pins V V are of such depth and length and the pins V V and rod W are so located with reference to each other that when the rod W is loosened a little from a rigid engagement with the pins the pins will by gravity drop and project a little below the bottom of the base, as shown in Fig. 1, whereby they become a guard by which to align the base with refefence to the edge of its support. When these pins are not needed they may be raised in their sockets, so that their ends will not project below the bottom of the base, and the pin W may be brought firmly against them by means of the set-screw Y, whereby they will be held entirely within the base. The line of motion of the nut W' is at right angles to the rod W, and is inclined upwardly a little, outwardly, to provide for the convenient manipulation of the set-screw Y.

What I claim as new, and desire to secure by Letters Patent, is—

1. In a surface-gage, the combination, with a base-piece supporting an adjustable pointer, of pins inserted movably in the under side of the base and a transverse rod bearing adjustably against the pins, substantially as described.

2. In a surface-gage, the combination, with a base-piece, of pins inserted movably in the under surface of the base-piece, a transverse rod bearing adjustably against the pins, a nut through which the transverse rod passes, and a set-screw bearing against the base-piece and turning into the nut through which the rod passes, substantially as described.

3. In a surface-gage, the combination, with a base-piece having a vertical flange, of a vertically-revoluble wheel pivoted on the flange and provided with a bracket supporting the standard of the gage therein, and means for clamping the wheel to the base, substantially as described.

4. In a surface-gage, the combination, with a base-piece, of a vertically-revoluble wheel pivoted thereon, which wheel supports the standard of the gage, and a bearing-block movable in the base-piece, and means for holding the bearing-block adjustably against the surface of the wheel, substantially as described.

5. In a surface-gage, the combination, with a base-piece, of a revoluble wheel axled thereon and clamped adjustably thereto, and a standard secured adjustably in a bracket on the wheel at one side of its axis, substantially as described.

6. In a surface-gage, the combination, with a standard, of a split sleeve movable thereon, which sleeve has a head-block, as F, rigid to one part of the sleeve and a small portion or projection, as F', rigid to the other part of the sleeve, a movable washer about a bolt passing through the head-block, which washer bears against the head-block and the movable part F', and a nut turning on the bolt for clamping the washer against the head-block and the part F', substantially as described.

7. In a surface-gage, the combination, with a head-piece, as F, supported movably on a standard, of a bolt, as G, passing through the head-piece, which bolt is provided with a head having an inner lesser diameter and an outer greater diameter, a ring, as K, about the part of the head having the smaller diameter, a pointer, as L, inserted through the head between the ring K and the outer part of the head of the bolt, and means for clamping the head of the bolt against the ring and against the head-block, substantially as described.

8. In a surface-gage, the combination, with a head-block, as F, a bolt, as G, passing through the head-block movably, and a pointer L, inserted transversely through the head of the bolt, of an arm, as N, rigid on the head-block, a movable arm, as N', pivoted on the bolt between the head-block and the head of the bolt and bearing frictionally against the head of the bolt, and means, substantially as described, for adjusting the arm N' toward and from the arm N.

9. In a surface-gage having a pointer-supporting head-block, as F, a bolt inserted movably through the head-block and provided with a head, through which the pointer is inserted transversely, in combination with a movable arm, as N', pivoted on the bolt between the head-block and the head of the bolt, and a soft-metal frictional washer, as P, inserted between the arm N' and the head of the bolt, substantially as described.

10. In a surface-gage having a pointer-supporting head-block, as F, a bolt passing movably through the head-block, which bolt is provided with a head in which the pointer is inserted transversely, in combination with a washer H, a set-screw G' turning on the bolt, and an interposed washer H', fitted on the bolt with a faced surface, so as not to be revoluble thereon, substantially as described.

11. In a surface-gage, the combination, with a wheel revoluble vertically on the base, and a bracket on the wheel at one side of its axis, of a standard adjustable in the bracket on the wheel, a sleeve, as C, adjustable endwise on the standard, and a sleeve, as E, carrying the pointer and adjustable on the sleeve C, substantially as described.

In testimony whereof I affix my signature in presence of two witnesses.

FRED A. WELLES.

Witnesses:
C. T. BENEDICT,
ANNA FAUST.